April 26, 1938.                F. A. COMPTON, JR                    2,115,570
                    METHOD OF WINDING DYNAMO-ELECTRIC MACHINES
                              Filed Sept. 29, 1937
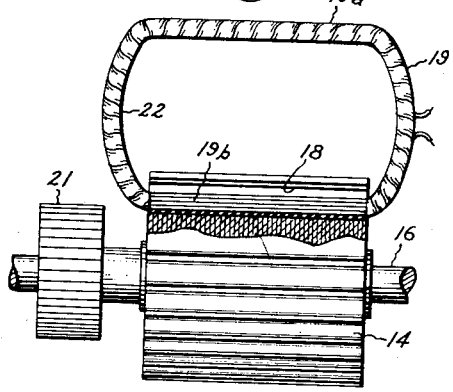
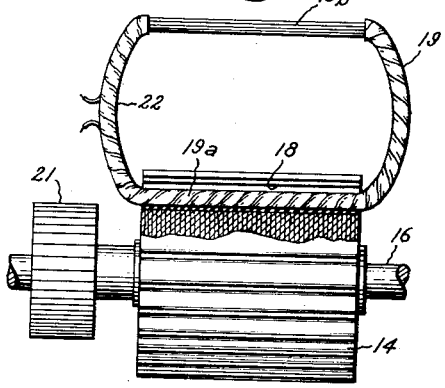
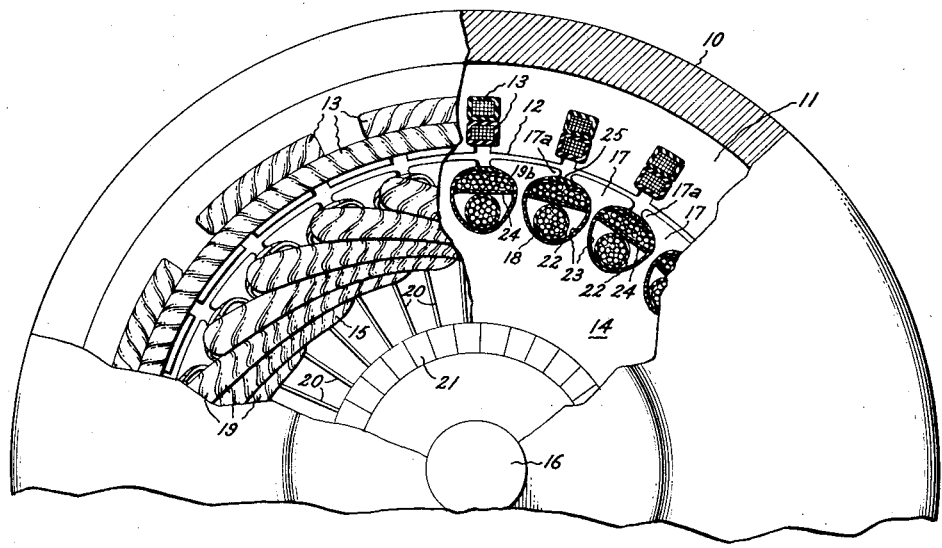
Inventor
Frank A. Compton Jr.,
by Harry E. Dunham
His Attorney.

Patented Apr. 26, 1938

2,115,570

UNITED STATES PATENT OFFICE 2,115,570

METHOD OF WINDING DYNAMO-ELECTRIC MACHINES

Frank A. Compton, Jr., Wesleyville, Pa., assignor to General Electric Company, a corporation of New York Application September 29, 1937, Serial No. 166,293

6 Claims. (Cl. 171—206)

My invention relates to dynamo-electric machines and more particularly to a method of winding the magnetic core structures thereof.

The core structure of a dynamo-electric machine is frequently provided with winding slots which are disposed below the outer surface of the core and restricted openings between the winding slots and the outer surface of the core. Difficulty has been encountered in winding core structures having winding slots of this character due to the fact that the cross-sections of the coils of the winding are usually wider than the restricted slot openings through which the coils must be inserted.

It is an object of my invention to provide an improved and simplified method of winding core structures having winding slots of the type described and utilizing similarly formed coils.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a fragmentary end elevation, partly in section, of a dynamo-electric machine provided with a core structure which has been wound in accordance with the method of my invention; Fig. 2 is a reduced side elevational view, partly in section, of the core structure of the dynamo-electric machine of Fig. 1, showing an initial step of the method of winding the same; and Fig. 3 is a view of the core structure of the dynamo-electric machine similar to that of Fig. 2, showing a subsequent step of the method of winding the same.

Referring to the drawing, in Fig. 1 I have shown a dynamo-electric machine 10 including a stationary member having a magnetic core structure 11 which is preferably of the laminated type. The core 11 is provided with a plurality of teeth 12 disposed about the inner circumference thereof and forming spaced-apart winding slots in which suitable field exciting windings 13 are arranged. The dynamo-electric machine 10 also includes an armature having a magnetic core structure 14 of cylindrical configuration which is preferably of the laminated type. The core 14 is provided with a winding 15 fully distributed over the outer surface thereof and is securely mounted upon a rotatable shaft 16 in any suitable manner. The core 14 is also provided with a plurality of spaced-apart teeth 17 forming a plurality of spaced-apart winding slots 18 extending longitudinally of the core and disposed adjacent the outer surface thereof. The teeth 17 are provided with circumferentially extending tips 17a which partially close the winding slots 18 and form restricted openings between the winding slots and the outer surface of the core 14. The winding 15 comprises a plurality of similarly formed coils 19 which are connected in circuit relationship by a plurality of riser connectors 20 to a commutator 21 carried by the shaft 16.

As best shown in Figs. 2 and 3, each of the coils 19 comprises a bundle of turns of insulated conductor and has a cross-section which is wider than the restricted openings between the winding slots 18 and the outer surface of the core 14. A portion 19a of the coil 19 is tightly wrapped with strip insulating material to form an enclosing casing 22 thereabout leaving a portion 19b of the coil exposed. The enclosed portion 19a of the coil 19 has a width which will not allow the same to be inserted into a winding slot 18 in the core 14 through its restricted opening. On the other hand, the cross-section of the exposed portion 19b of the coil 19 may be deformed or flattened by spreading the turns apart. The exposed portion 19b of the coil 19 may then be inserted into a winding slot 18 in the core 14 through its restricted opening.

An insulating liner 23 is arranged in each of the winding slots 18 in the core 14 in order to prevent direct contact between the winding 15 and the laminated core. The enclosed portion 19a of each of the coils 19 is arranged in the bottom of a corresponding one of the winding slots 18 and the exposed portion 19b thereof is arranged in the top of a corresponding one of the winding slots 18, the second-mentioned winding slots being displaced from the first-mentioned winding slots by the pitch of a coil 19. A layer of insulating material 24 is arranged in each of the winding slots 18 and is interposed between the enclosed portion 19a of one of the coils 19 therein and the exposed portion 19b of another of the coils 19 therein. The adjacent upper edges of each of the insulating liners 23 are bent toward each other and an insulating strip 25 is placed in each of the winding slots 18 over the adjacent edges of the insulating liner 23 and the exposed portion 19b of the coil 19 therein in order to wedge securely the portions of the coils in place and to retain the winding 15 in position.

In winding the core 14 of the dynamo-electric machine 10 a plurality of the coils 19 are formed, each coil comprising a bundle of turns of insulated conductor and having a cross-section wider than the restricted opening between a winding slot 18 in the core 14 and the outer surface thereof. The portion 19a of each of the coils 19 is tightly wrapped with strip insulating material to form the enclosing casing 22 therefor, leaving the portion 19b of the coil exposed. The insulating liners 23 are then placed in the winding slots 18 in the core 14. The cross-section of the exposed portion 19b of one of the coils 19 is deformed by spreading the turns apart and inserted into one of the winding slots 18 in the core 14 through its restricted opening as shown in Fig. 2. The coil 19 is then shifted to bring the enclosed portion 19a thereof into position in the winding slot as shown in Fig. 3, the coil 19 being sufficiently deformable to allow the same to be shifted in the winding slot 18. A coil 19 is formed for each of the winding slots 18 and placed therein in a similar manner. The enclosed portions 19a of the coils 19 are then arranged in the bottoms of the winding slots 18a and the exposed portions 19b thereof are arranged in spaced relation to the core 14. The layer of insulating material 24 is placed in each of the winding slots 18 over the enclosed portion 19a of the coil 19 therein. Each of the coils is then rotated to bring the exposed portion 19b thereof into alignment with another of the winding slots 18 disposed a coil pitch from the winding slot in which the enclosed portion 19a thereof is arranged. The cross-section of the exposed portion 19b of each of the coils 19 is deformed or flattened by spreading the turns apart and inserted into the winding slot in alignment therewith through its restricted opening. The adjacent edges of each of the insulating liners 23 are bent toward each other and the insulating strips 25 are inserted into the winding slots 18 over the adjacent edges of the insulating liners 23 and the exposed portions 19b of the coils 19 in order to wedge securely the portions of the coils 19 in place in each of the winding slots 18 and to retain the winding 15 in place.

While I have shown and described my invention as applied to the winding of core structures of dynamo-electric machines, I do not desire my invention to be limited to the particular method described, and I intend in the appended claims to cover all modifications within the spirit and scope of my invention.

What I claim as new and desire to secure by Letters Patent of the United States is:

1. The method of winding a magnetic core structure having a plurality of spaced-apart winding slots provided with restricted openings which includes forming a coil having a cross-section wider than the restricted openings of the winding slots and comprising a bundle of turns, enclosing a portion of said coil in a casing leaving another portion thereof exposed whereby the cross-section of said exposed portion of said coil may be deformed and the turns thereof inserted into a winding slot through its restricted opening, inserting said exposed portion of said coil into one of the winding slots through its restricted opening, shifting said coil to bring said enclosed portion thereof into said one winding slot, inserting said exposed portion of said coil into another of the winding slots through its restricted opening, and securing said coil in place in said winding slots.

2. The method of winding a magnetic core structure having a plurality of spaced-apart winding slots provided with restricted openings which includes forming a coil having a cross-section wider than the restricted openings of the winding slots and comprising a bundle of turns, enclosing a portion of said coil in a casing leaving another portion thereof exposed whereby the cross-section of said exposed portion of said coil may be deformed and the turns thereof inserted into a winding slot through its restricted opening, inserting said exposed portion of said coil into one of the winding slots through its restricted opening, shifting said coil to bring said enclosed portion thereof into said one winding slot, rotating said coil to bring said exposed portion thereof into alignment with another of the winding slots, inserting said exposed portion of said coil into said second-mentioned winding slot through its restricted opening, and securing said coil in place in said winding slots.

3. The method of winding a magnetic core structure having a plurality of spaced-apart winding slots provided with restricted openings which includes forming a coil having a cross-section wider than the restricted openings of the winding slots and comprising a bundle of turns, enclosing a portion of said coil in a casing leaving another portion thereof exposed whereby the turns of said exposed portion of said coil may be spread apart and inserted into a winding slot through its restricted opening, spreading the turns of said exposed portion of said coil and inserting the same into one of the winding slots through its restricted opening, shifting said coil to bring said enclosed portion thereof into said one winding slot, spreading the turns of said exposed portion of said coil and inserting the same into another of the winding slots through its restricted opening, and securing said coil in place in said winding slots.

4. The method of winding a magnetic core structure having a plurality of spaced-apart winding slots provided with restricted openings which includes forming a coil having a cross-section wider than the restricted openings of the winding slots and comprising a bundle of turns of insulated conductor, wrapping strip insulating material about a portion of said coil to enclose the same leaving another portion thereof exposed whereby the cross-section of said exposed portion of said coil may be deformed and the turns thereof inserted into a winding slot through its restricted opening, inserting said exposed portion of said coil into one of the winding slots through its restricted opening, shifting said coil to bring said enclosed portion thereof into said one winding slot, inserting said exposed portion of said coil into another of the winding slots through its restricted opening, and securing said coil in place in said winding slots.

5. The method of winding a magnetic core structure having a plurality of spaced-apart winding slots provided with restricted openings which includes forming a coil having a cross-section wider than the restricted openings of the winding slots and comprising a bundle of turns, enclosing a portion of said coil in a casing leaving another portion thereof exposed whereby the cross-section of said exposed portion of said coil may be deformed and the turns thereof inserted into a winding slot through its restricted opening, inserting said exposed portion of said coil into one of the winding slots through its restricted opening, shifting said coil to bring said enclosed portion thereof into said one winding slot, placing a portion of another coil in the bottom of another of the windings slots, placing a layer of insulating material in said second-mentioned winding slot over the portion of said second-mentioned coil therein, rotating said first-mentioned coil to bring said exposed portion thereof into alignment with said second-mentioned winding slot, inserting said exposed portion of said first-mentioned coil into said second-mentioned winding slot through its restricted opening, and inserting an insulating strip into said second-mentioned winding slots over said exposed portion of said first-mentioned coil to retain said coils in place.

6. The method of winding the core of a dynamo-electric machine having a plurality of spaced-apart winding slots provided with restricted openings which includes forming a coil having a cross-section wider than the restricted openings of the winding slots and comprising a bundle of turns, enclosing a portion of said coil in a casing leaving another portion thereof exposed whereby the cross-section of said exposed portion of said coil may be deformed and the turns thereof inserted into a winding slot through its restricted opening, placing an insulating liner in one of the winding slots, inserting said exposed portion of said coil into said one winding slot through its restricted opening, shifting said coil to bring said enclosed portion thereof into said one winding slot, placing an insulating liner in another of the winding slots, placing a portion of another coil in the bottom of said second-mentioned winding slot, placing a layer of insulating material in said second-mentioned winding slot over the portion of said second-mentioned coil therein, rotating said first-mentioned coil to bring said exposed portion thereof into alignment with said second-mentioned winding slot, inserting said exposed portion of said first-mentioned coil into said second-mentioned winding slot through its restricted opening, and inserting an insulating strip into said second-mentioned winding slots over said exposed portion of said first-mentioned coil to retain said coils in place.

FRANK A. COMPTON, JR,